United States Patent [19]

Taylor et al.

[11] Patent Number: 4,690,499

[45] Date of Patent: Sep. 1, 1987

[54] OPTICAL FIBRE ELEMENT HOUSED IN A TUBE RESILIENTLY SET IN A FORM SUCH THAT ITS LONGITUDINAL AXIS FOLLOWS A PATH GREATER THAN THE RECTILINEAR DISTANCE BETWEEN POINTS TO BE CONNECTED

[75] Inventors: John E. Taylor, Maidenhead; Ian W. Keene, London, both of England

[73] Assignee: BICC Public Limited Company, London, England

[21] Appl. No.: 711,247

[22] Filed: Mar. 13, 1985

[30] Foreign Application Priority Data

Mar. 14, 1984 [GB] United Kingdom ............... 8406635

[51] Int. Cl.[4] ................................................ G02B 6/44
[52] U.S. Cl. .................................. 350/96.23; 350/320
[58] Field of Search ................... 350/96.23, 320; 174/68 C, 705, 75 F, 108, 113 AS, 116, 117 R, 117 F, 117 AS, 131 R

[56] References Cited

U.S. PATENT DOCUMENTS

| 4,089,585 | 5/1978 | Slaughter et al. | 350/96.23 |
| 4,178,069 | 12/1979 | Andersen et al. | 350/96.23 |
| 4,513,787 | 4/1985 | Hegler et al. | 174/68 C X |

FOREIGN PATENT DOCUMENTS

| 58-150906 | 9/1983 | Japan | 350/96.23 |
| 2019601 | 10/1979 | United Kingdom . | |
| 1582851 | 1/1981 | United Kingdom | 350/96.23 |
| 1584249 | 2/1981 | United Kingdom . | |
| 2085188 | 4/1982 | United Kingdom . | |
| 2141558 | 12/1984 | United Kingdom . | |
| 2141559 | 12/1984 | United Kingdom . | |

OTHER PUBLICATIONS

"NKF Kabel Develops Silica/Silicone Gel to Protect Fiber Cables from Moisture", Laser Focus, vol. 17, No. 2, Feb. 1981, pp. 56–57.

Miller, C. M., "Laminated Fiber Ribbon for Optical Communication Cables", The Bell System Technical Journal; vol. 55, No. 7, Sep. 1976, pp. 929–935.

*Primary Examiner*—John Lee
*Attorney, Agent, or Firm*—Buell, Ziesenheim, Beck & Alstadt

[57] ABSTRACT

In an optical fibre element comprising a flexible tube in which optical fibres are loosely housed, the tube is resiliently set in such a form that it follows a longitudinally extending path which, between any two longitudinally spaced positions, is greater in length than the rectilinear distance between the two positions. Preferably, the tube is resiliently set to follow a path of smoothly curved undulations, the axes of curvature of which lie parallel to one another and normal to the axis of the tube. When the resiliently set tube is subjected to a longitudinally applied tensile force, the tube will tend to straighten against the action of its resilient set, thereby to reduce the tensile force applied to the optical fibres.

21 Claims, 6 Drawing Figures

OPTICAL FIBRE ELEMENT HOUSED IN A TUBE RESILIENTLY SET IN A FORM SUCH THAT ITS LONGITUDINAL AXIS FOLLOWS A PATH GREATER THAN THE RECTILINEAR DISTANCE BETWEEN POINTS TO BE CONNECTED

This invention relates to optical fibre elements for the transmission of the ultra-violet, visible and infra red regions of the electromagnetic spectrum, which regions, for convenience, will hereinafter all be included in the generic term "light" and especially, but not exclusively, to optical fibre elements for use in the communications field adapted for transmission of light having a wave length within the range 0.8 to 2.1 micrometers.

The invention is particularly concerned with an optical fibre element of the kind comprising a flexible tube of plastics or other material having a bore in which at least one optical fibre is so loosely housed that, when the tube is bent or otherwise flexed, the or each optical fibre is free to move to a limited extent transversely of and with respect to the tube.

It is an object of the present invention to provide an improved optical fibre element of the aforesaid kind which is especially, but not exclusively, suitable for use in an optical cable or other application where there is a risk that the or any optical fibre will be subjected to a longitudinally applied tensile force.

According to the invention, the improved optical fibre element comprises a flexible tube having a bore in which at least one optical fibre is loosely housed, wherein the tube is resiliently set in such a form that the central longitudinal axis of the tube follows a longitudinally extending path which, between any two longitudinally spaced positions, is greater in length than the rectilinear distance between said two positions, the arrangement being such that, when the resiliently set tube is subjected to a longitudinally applied tensile force, the tube will tend to straighten in a lengthwise direction against the action of its resilient set thereby to reduce the tensile force applied to the or each optical fibre and, when the tensile force is removed, the tube will return under the action of its resilient set towards its original form.

Preferably, the flexible tube is resiliently set in such a form that the central longitudinal axis of the tube follows a path of smoothly curved undulations, the axes of curvature of the undulations preferably lying parallel to one another and substantially normal to the longitudinal axis of the tube. By virtue of the smoothly curved undulations, when the resiliently set tube is subjected to a longitudinally applied tensile force, the tube will tend to straighten against the action of its resilient set; that is to say, the length of the radii of the smoothly curved undulations will gradually increase. Alternatively, the flexible tube may be resiliently set in such a form that the central longitudinal axis of the tube follows a substantially helical path, the lay of the helically extending path preferably lying in the range 5° to 15° to the central rectilinear axis of the helically extending tube.

The flexible tube may be of circular or non-circular cross-section and, in each case, preferably the radial thickness of the tube wall is substantially constant at all transverse cross-sections of the tube. Where the flexible tube is of non-circular cross-section, preferably it has a transverse cross-section of elongate form, e.g. of an elongate form having two major parallel sides joined by ends of approximately semi-circular shape, and in this case preferably the flexible tube is resiliently set in such a form that the central longitudinal axis of the tube follows a path of smoothly curved undulations whose axes of curvature lie substantially parallel to the major transverse axis of the flexible tube.

The flexible tube is preferably of a plastics material or plastics materials which can be readily resiliently set so that its central longitudinal axis follows a path of the required form but it is to be understood that, in some circumstances, the tube may be of resilient metal or metal alloy. Especially suitable plastics materials of which the tube may be made and which can be readily resiliently set include orientated polyethylene terephthalate sold under the trade name "Arnite", and, when during service the optical fibre element is likely to be subjected for a short period to a temperature exceeding 300° C., polyethersulphone sold under the trade name "Victrex PES" or polyetherimide sold under the trade name "Ultem".

Alternatively, the flexible tube may be of a plastics material or plastics materials which cannot be readily resiliently set and may have embedded in the tube wall at mutually spaced positions a plurality of resilient elongate reinforcing elements, each of a material that can be so resiliently set as to cause the central longitudinal axis of the tube to follow a path of the required form.

The or each optical fibre loosely housed in the resiliently set flexible tube preferably is unsupported but, in some circumstances and especially when the tube follows a path of smoothly curved undulations, two or more optical fibres of the optical fibre element may be component parts of at least one optical fibre ribbon structure loosely housed in the bore of the tube. In this case, the optical fibres, and if desired one or more than one flexible elongate reinforcing element, of an optical fibre ribbon structure preferably are arranged side by side and are wholly or partially embedded in a flexible elongate body of plastics material or are arranged side by side and are secured to one major surface of a flexible tape.

The use of the improved optical element of this invention in a flexible elongate body is disclosed in co-pending application Ser. No. 711,248, filed Mar. 13, 1985.

In all cases, the resiliently set tube may be substantially filled throughout its length with a water-impermeable medium of a grease like nature which is of such a consistency that the or each optical fibre or the or each optical fibre ribbon structure is free to move relative to the tube when the tube is bent or otherwise flexed. The water-impermeable medium of a grease like nature may consist of, or may comprise as a major constituent, silicone gel.

In a preferred method of effecting the resilient set in the flexible plastics tube of the improved optical fibre element, the tube, with the optical fibre or fibres loosely housed in the bore thereof, is caused to travel in the direction of its length; the advancing tube is heated and is then partially wrapped around each of a plurality of transversely spaced, longitudinally staggered formers of substantially circular or partially circular cross-section travelling in the same direction as the advancing tube, the direction of wrap around one former being in the opposite circumferential direction to the direction of wrap around the or each adjacent former and the circumferential extent of wrap around each of the formers being such that the tube undulates in the direction of its length; and, while the tube is partially wrapped around the formers, the tube is cooled or permitted to cool so that it is resiliently set in a smoothly curved undulating form.

Preferably, the transversely spaced longitudinally staggered formers are carried on a pair of endless belts.

Where the flexible tube of the improved optical fibre element is made of a plastics material which cannot be readily resiliently set and has embedded in the tube wall at mutually spaced positions a plurality of resilient elongate reinforcing elements and where the flexible tube is made of a resilient metal or metal alloy, preferably the resilient set is effected in the flexible tube by causing the tube, with the optical fibre or fibres loosely housed in the bore thereof, to travel in the direction of its length, partially wrapping the advancing tube around each of a plurality of transversely spaced, longitudinally staggered formers of substantially circular or partially circular cross-section travelling in the same direction as the advancing tube, the direction of wrap around one former being in the opposite circumferential direction to the direction of wrap around the or each adjacent former and the circumferential extent of wrap around each of the formers being such that the tube undulates in the direction of its length, and withdrawing the tube from the formers resiliently set in a smoothly curved undulating form.

The invention also includes an optical cable comprising at least one optical fibre element loosely housed in a bore extending lengthwise within the cable, wherein the or each optical fibre element is an improved optical fibre element as hereinbefore described.

Preferably, only one improved optical fibre element is loosely housed in the bore of the cable.

A preferred optical cable comprises a tube of plastics material having loosely housed in its bore at least one improved optical fibre element as hereinbefore described. The tube may have embedded in its wall a plurality of mutually spaced separate elongate reinforcing members.

Another preferred form of optical cable which may include an improved optical fibre element as hereinbefore described comprises a plurality of separately formed tubes of plastics material in the bore of at least one of which is loosely housed at least one improved optical fibre element as hereinbefore described, an outer protective sheath surrounding the plurality of tubes and, embedded in or surrounded by the outer protective sheath, at least one elongate reinforcing member.

Since, in its preferred form, the flexible tube of the improved optical fibre element can be substantially filled throughout its length with a water-impermeable medium of a grease like nature, when the improved optical fibre element is loosely housed in a bore in an optical cable, there is may necessity to fill that part of the bore of the optical cable not occupied by the improved optical fibre element or elements with a water-impermeable material of a grease like nature. As a result, not only is there a saving in greasy water-impermeable medium but there is provided access for escape of hydrogen which might otherwise have a deleterious effect on the optical fibre or fibres.

The invention is further illustrated by a description, by way of example, of three preferred forms of improved optical fibre element, the preferred method of manufacture of an improved optical fibre element, and of one preferred form of optical cable incorporating an improved optical fibre element, with reference to the accompanying drawings, in which.

Figure 1:
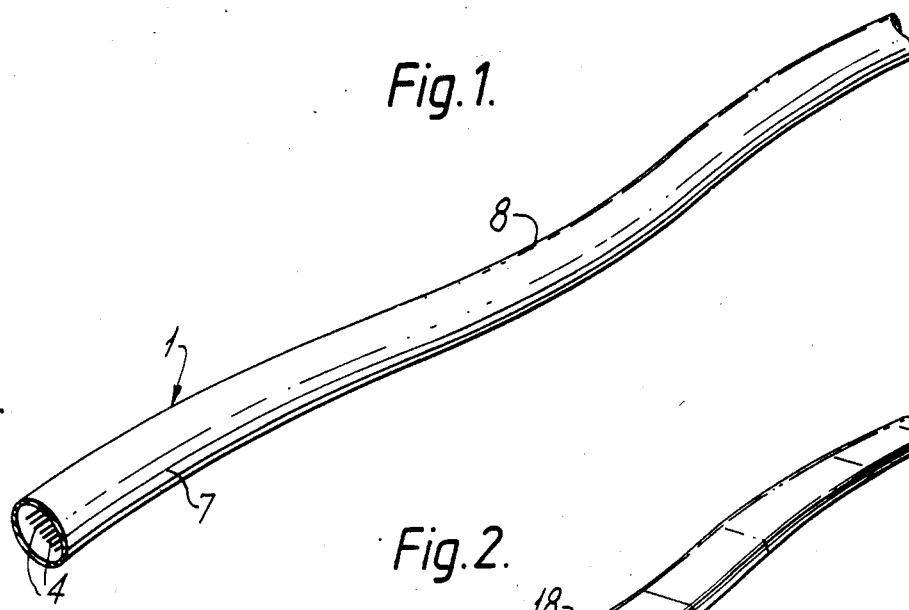
FIG. 1 is an isometric diagrammtic view, drawn on an enlarged scale, of the first preferred optical fibre element.

Referring to FIG. 1, the first preferred form of optical fibre element 1 comprises eight optical fibres 4 each of which has an overall diameter of 250 um and which are loosely housed in a flexible tube 7 of orientated polyethylene teraphthalate, which tube is of substantially constant circular cross-section throughout its length and has a radial wall thickness of 0.4 mm and an internal diameter of 1.8 mm. Each of the optical fibres 4 may have a coating of a colour different from that of a coating on each of the other optical fibres. The flexible tube 7 is resiliently set in such a form that the central longitudinal axis of the tube, and hence the tube, follows a path of smoothly curved undulations 8 which have radii of curvature of approximately 60 mm and whose axes of curvature lie parallel to one another and substantially normal to the longitudinal axis of the tube.

Figure 2:
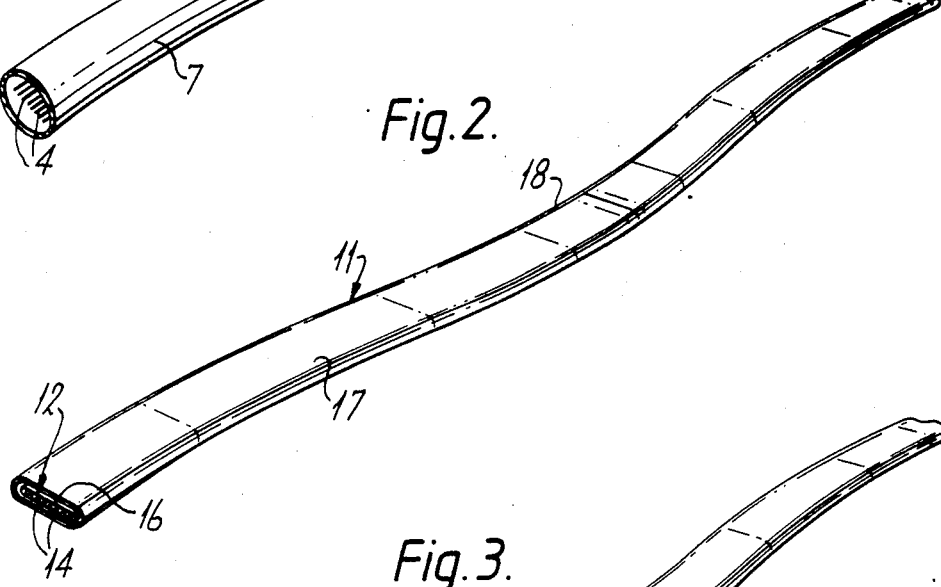
FIG. 2 is an isometric diagrammatic view, drawn on an enlarged scale, of the second preferred form of optical fibre element.

The second preferred form of optical fibre element 11 shown in FIG. 2 comprises an optical fibre ribbon structure 12 comprising eight optical fibres 14 arranged side by side and embedded in an elongate body 16 of silicone acrylate. Each of the optical fibres 14 has an overall diameter of 250 um. Each of the optical fibres 14 may have a coating of a colour different from that of a coating on each of the other optical fibres. The optical fibre ribbon structure 12 is loosely housed in the bore of a flexible tube 17 which is made of orientated polyethylene teraphthalate and which has a transverse cross-section of an elongate form having two major parallel sides joined by ends of approximately semi-circular shape. The flexible tube 17 has a substantially constant wall thickness of 0.3 mm, an internal major transverse dimension of 2.5 mm and an internal minor transverse dimension of 1.0 mm; the optical fibre ribbon structure 12 has a major transverse dimension of 2.2 mm and a minor transverse dimension of 0.3 mm. The flexible tube 17 is resiliently set in such a form that the central longitudinal axis of the tube, and hence the tube, follows a path of smoothly curved undulations 18 which have radii of curvature of approximately 60 mm and whose axes of curvature lie substantially parallel to the major transverse axes of the flexible tube.

Figure 3:
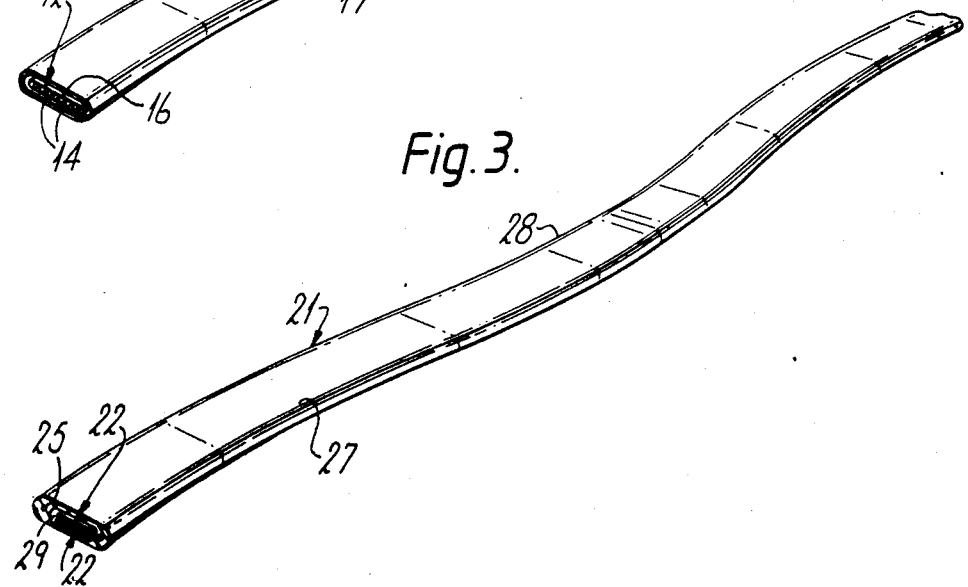
FIG. 3 is an isometric diagrammatic view, drawn on an enlarged scale, of the third preferred form of optical fibre element.
Figure 4:
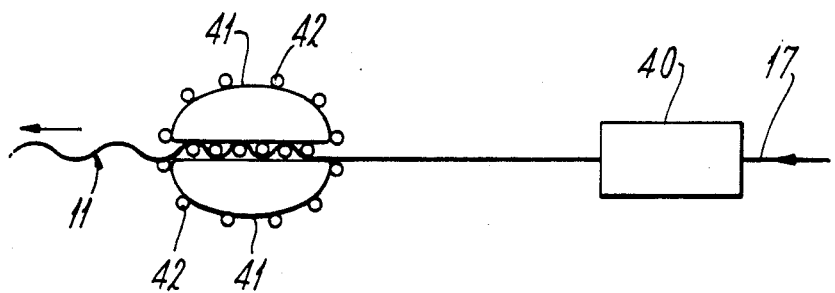
FIG. 4 is a schematic representation of the preferred method of manufacturing the optical fibre element shown in FIG. 2.

Referring to FIG. 3, the third preferred form of optical fibre element 21 comprises an elongate body 27 which is made of a thermoplastics material and which has a transverse cross-section of elongate form having two major parallel sides joined by ends of approximately semi-circular shape. The elongate body 27 has a major transverse dimension of 6.0 mm and a minor transverse dimension of 2.0 mm. Extending throughout the length of the elongate body 27 is a bore 29 which has a transverse cross-section of similar shape to that of the body and, embedded in the body on opposite sides of the bore 29, are a pair of resilient copper wires 25. Loosely housed in the bore 29 are two single optical ribbon structure 22 each comprising eight optical fibres 24 arranged side by side and embedded in an elongate body 26 of silicone acrylate, each of which optical fibres has an overall diameter of 250 um. Each copper wire 25 is set in such a form that the central longitudinal axis of the elongate body 27 and hence the body itself, follows a path of smoothly curved undulations 28 which have radii of curvature of approximately 60 mm and whose axes of curvature lie parallel to one another and to the major transverse axes of the elongate body.

When the optical fibre elements 1, 11, 21 shown in FIGS. 1 to 3 are subjected to a tensile force, the flexible tubes 7 and 17 and the elongate body 27 will tend to straighten in a lengthwise direction against the action of the resilient set in the tubes or in the copper wires 25 thereby reducing the tensile force that would otherwise be applied to the optical fibres 4 and optical fibre ribbon 12 and 22. After the tensile force is removed, the resilient set in the tubes 7 and 17 and in the copper wires 25 will cause the optical fibre elements 1,11,21 to return towards their original undulating form.

In the preferred method of manufacturing the second preferred form of optical fibre element 11 shown in FIG. 2, the plastics tube 17 with the optical fibre ribbon structure 12 loosely housed in the bore of the tube is caused to travel in the direction of its length through a heating device 40 which heats the orientated polyethylene teraphthalate material of the tube and the tube then passes between a pair of endless belts 41, advancing in the direction of travel of the tube, each of which belts carries a plurality of transversely extending, longitudinally spaced formers 42 of partially circular cross-section, the formers on one belt inter-engaging between the formers on the other belt. The tube 17 is partially wrapped around each of the inter-engaging formers 42, the direction of wrap around one former being in the opposite circumferential direction to the direction of wrap around each or the adjacent former. The circumferential extent of wrap around each of the formers 42 is such that the tube 17 follows a path of smoothly curved undulations whose axes of curvature lie parallel to one another and to the major transverse axes of the tube. The formers 42 and the tube 17 partially wrapped around the formers are continuously artificially cooled, e.g. by the direction of compressed air, by immersion in a cooling bath or by a surrounding refrigerated enclosure, so that, on emerging from the endless belts 41, the optical fibre element 11 is resiliently set in such a form that it follows a path of smoothly curved undulations whose axes of curvature lie parallel to one another and to the major transverse axes of the tube.

Figure 5:
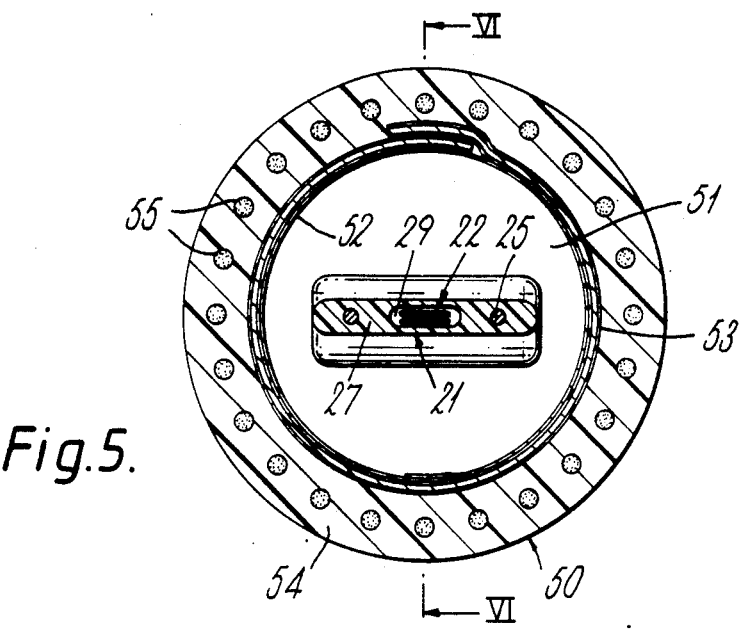
FIG. 5 is a transverse cross-sectional view of a preferred optical cable incorporating an optical fibre element as shown in FIG. 3.
Figure 6:
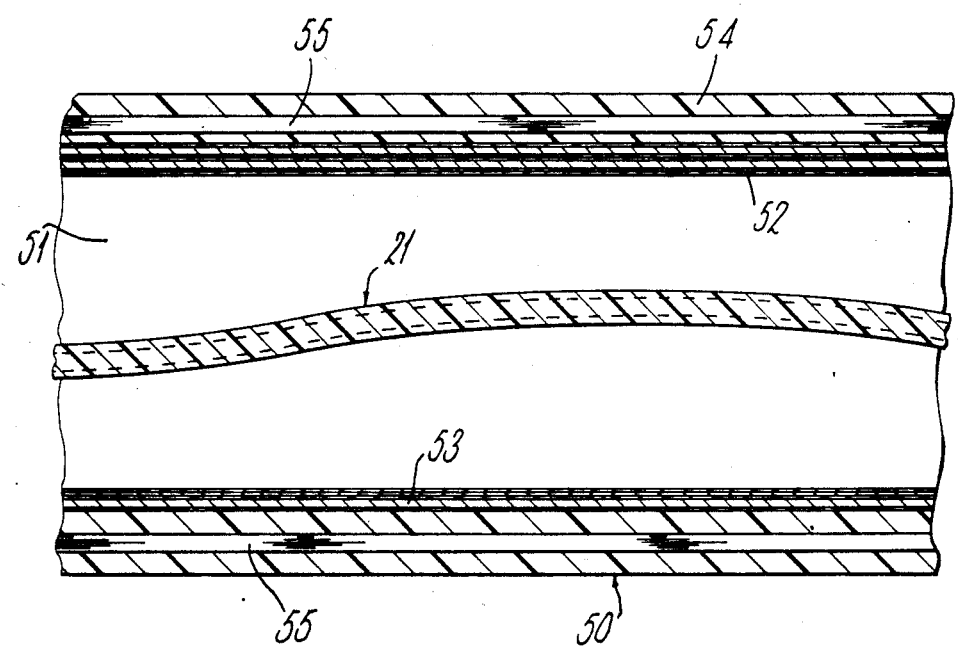
FIG. 6 is a sectional side view of the optical cable taken on the line VI—VI in FIG. 5.

The preferred optical cable shown in FIGS. 5 and 6 comprises a composite tube 50 which bounds a bore 51 and which comprises a longitudinally extending, transversely folded paper tape 52 whose longitudinally extending marginal edges overlap and are secured together by adhesive, a longitudinally extending, transversely folded plastics/aluminum/plastics composite tape 53 whose longitudinally extending marginal edges overlap at a position circumferentially spaced from the overlapping marginal edges of the paper tape 52, and an outer extruded sheath 54 of plastics material which is bonded to the outer plastics coating of the composite tape 53. Embedded in the plastics sheath 54 at circumferentially spaced positions are twenty-four bunches 55 of compacted yarns of glass fibre, each of which has undulations which serve to improve the mechanical bonding of the bunch within the sheath and the flexibility of the cable. Loosely housed in the bore 51 of the optical cable is an undulating optical fibre element 21 as shown in FIG. 3. The bore 51 has a diameter of 9 mm; the composite tube 50 has an overall diameter of 15 mm.

Manufacture of the optical fibre element and manufacture of the optical cable of which the optical fibre element is a component part may be effected as separate operations, or manufacture of the optical fibre element and of the optical cable may be effected in tandem.

We claim:

1. An optical fibre element comprising a flexible tube having a bore in which at least one optical fibre is loosely housed, wherein the tube is resiliently set in such a form that the central longitudinal axis of the tube follows a longitudinally extending path which, between any two longitudinally spaced positions, is greater in length than the rectilinear distance between said two positions, the arrangement being such that, when the resiliently set tube is subjected to a longitudinally applied tensile force, the tube will tend to straighten in a lengthwise direction against the action of its resilient set thereby to reduce the tensile force applied to the or each optical fibre and, when the tensile force is removed, the tube will return under the action of its resilient set towards it original form.

2. An optical fibre element as claimed in Claim 1, wherein the flexible tube is resiliently set in such a form that the central longitudinal axis of the tube follows a substantially helical path, the lay of the helically extending path lying in the range 5° to 15° to the central rectilinear axis of the helically extending tube.

3. An optical fibre element as claimed in claim 1, wherein the flexible tube is of a plastics material or materials.

4. An optical fibre element as claimed in claim 1, wherein the or each optical fibre loosely housed in the resiliently set flexible tube is unsupported.

5. An optical fibre element as claimed in claim 1, wherein the resiliently set flexible tube is substantially filled throughout its length with a water-impermeable medium of a grease like nature which is of such a consistency that the or each optical fibre is free to move relative to the tube when the tube is flexed.

6. An optical fibre element as claimed in claim 5, wherein the water-impermeable medium of a grease like nature consists of, or comprises as a major constituent, silicone gel.

7. An optical fibre element comprising a flexible tube having a bore in which at least one optical fibre is loosely housed, wherein the tube is resiliently set in such a form that the central longitudinal axis of the tube follows a path of smoothly curved undulations whose axes of curvature lie parallel to one another and substantially normal to the longitudinal axis of the tube, the arrangement being such that, when the undulating flexible tube is subjected to a longitudinally applied tensile force, the tube will tend to straighten in a lengthwise direction against the action of the undulating resilient set thereby to reduce the tensile force applied to the or each optical fibre and, when the tensile force is removed, the tube will return under the action of its undulating resilient set towards its original form.

8. An optical fibre element as claimed in claim 7, wherein the flexible tube has a transverse cross-section of an elongate form having two major parallel sides joined by ends of approximately semi-circular shape, the flexible tube being resiliently set in such a form that the axes of curvature of the smoothly curved undulations lie substantially parallel to the major transverse axis of the flexible tube.

9. An optical fibre element as claimed in claim 8, wherein the flexible tube is made of orientated polyethylene terephthalate.

10. An optical fibre element as claimed in claim 8, wherein the flexible tube is made of polyethersulphone or of polyetherimide.

11. An optical fibre element as claimed in claim 7, wherein the flexible tube is of plastics material and has embedded in the tube wall at mutually spaced positions a plurality of resilient elongate reinforcing elements, each of which is so resiliently set as to cause the central longitudinal axis of the tube to follow the path of required form.

12. An optical fibre element as claimed in claim 7, wherein the flexible tube is made of a resilient metal or metal alloy.

13. An optical fibre element as claimed in claim 1 or 7, wherein at least two optical fibres are component parts of at least one optical fibre ribbon structure loosely housed in the bore of the resiliently set flexible tube.

14. An optical fibre element as claimed in claim 1 or 7, wherein at least one optical fibre ribbon structure is loosely housed in the bore of the resiliently set flexible tube, which ribbon structure comprises at least two optical fibres and at least one flexible elongate reinforcing element arranged side by side with one another and at least partially embedded in a flexible elongate body of plastics material.

15. An optical fibre element as claimed in claim 1, 7 or 2, wherein the tube is of non-circular cross-section and the radial thickness of the tube wall is substantially constant at all transverse cross-sections of the tube.

16. A method of effecting a resilient set in the flexible tube of an optical fibre element comprising a flexible tube of plastics material having a bore in which at least one optical fibre is loosely housed, wherein the tube, with said at least one optical fibre loosely housed in the bore thereof, is caused to travel in the direction of its length; the advancing tube is heated and is then partially wrapped around each of a plurality of transversely spaced, longitudinally staggered formers of at least partially circular cross-section travelling in the same direction as the advancing tube, the direction of wrap around one former being in the opposite circumferential direction to the direction of wrap around the or each adjacent former and the circumferential extent of wrap around each of the formers being such that the tube undulates in the direction of its length; and, while the tube is partially wrapped around the formers, the tube is cooled or permitted to cool so that it is resiliently set in a curved undulating form.

17. A method of effecting a resilient set in the flexible tube of an optical fibre element comprising a flexible tube of plastics material having embedded in the tube wall at mutually spaced positions a plurality of resilient elongate reinforcing elements and having a bore in which at least one optical fibre is loosely housed, wherein the tube, with said at least one optical fibre loosely housed in the bore thereof, is caused to travel in the direction of its length; the advancing tube is partially wrapped around each of a plurality of transversely spaced, longitudinally staggered formers of at least partly circular cross-section travelling in the same direction as the advancing tube, the direction of wrap around one former being in the opposite circumferential direction to the direction of wrap around the or each adjacent former and the circumferential extent of wrap around each of the formers being such that the tube undulates in the direction of its length; and the tube is withdrawn from the formers resiliently set in a smoothly curved undulating form.

18. An optical cable comprising at least one optical fibre element loosely housed in a bore extending lengthwise within the cable, wherein the or each optical fibre element comprises a flexible tube having a bore in which at least one optical fibre is loosely housed, the tube being resiliently set in such a form that the central longitudinal axis of the tube follows a longitudinally extending path which, between any two longitudinally spaced positions, is greater in length than the rectilinear distance between said two positions.

19. An optical cable comprising a tube of plastics material having loosely housed in its bore at least one optical fibre element comprising a flexible tube having a bore in which at least one optical fibre is loosely housed, the tube of the optical fibre element being resiliently set in such a form that the central longitudinal axis of said tube follows a longitudinally extending path which, between any two longitudinally spaced positions, is greater in length than the rectilinear distance between said two positions.

20. An optical cable comprising at least two separate tubes of plastics material extending side by side and, surrounding the tubes, an outer sheath of plastics material, the bore of at least one of the tubes having loosely housed therein at least one optical fibre element comprising a flexible tube having a bore in which at least one optical fibre is loosely housed, the tube of the optical fibre element being resiliently set in such a form that the central longitudinal axis of said tube follows a longitudinally extending path which, between any two longitudinally spaced positions, is greater in length than the rectilinear distance between said two positions.

21. An optical cable as claimed in claim 18, 19 or 20, wherein the tube of the optical fibre element is resiliently set in such a form that the central longitudinal axis of the tube follows a path of smoothly curved undulations whose axes of curvature lie parallel to one another and substantially normal to the longitudinal axis of the tube.

* * * * *